(12) United States Patent
Ehrhard et al.

(10) Patent No.: US 10,526,955 B2
(45) Date of Patent: *Jan. 7, 2020

(54) SUPERCHARGING DEVICE FOR AN INTERNAL COMBUSTION ENGINE, AND OPERATING METHOD FOR THE SUPERCHARGING DEVICE

(71) Applicant: CPT Group GmbH, Hannover (DE)

(72) Inventors: Jan Ehrhard, Wiesloch (DE); Nisar Al-Hasan, München (DE); Hong Zhang, Tegernheim (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,885

(22) Filed: May 10, 2017

(65) Prior Publication Data

US 2017/0241328 A1 Aug. 24, 2017

Related U.S. Application Data

(63) Continuation of application No. PCT/EP2015/073170, filed on Oct. 7, 2015.

(30) Foreign Application Priority Data

Nov. 24, 2014 (DE) .................... 10 2014 223 891

(51) Int. Cl.
*F02B 37/04* (2006.01)
*F02M 35/10* (2006.01)
(Continued)

(52) U.S. Cl.
CPC .............. *F02B 37/04* (2013.01); *F02B 33/34* (2013.01); *F02B 33/44* (2013.01); *F02B 37/005* (2013.01);
(Continued)

(58) Field of Classification Search
CPC .... F02B 37/001; F02B 37/004; F02B 37/005; F02B 37/007; F02B 37/013; F02B 37/10; F02B 39/10; F02B 37/16; F02B 37/24
See application file for complete search history.

(56) References Cited

U.S. PATENT DOCUMENTS 4,282,713 A 8/1981 Antoku et al.
6,318,085 B1 11/2001 Torno et al.
(Continued)

FOREIGN PATENT DOCUMENTS

CN 1485533 A 3/2004
CN 102400773 A 4/2012
(Continued)

OTHER PUBLICATIONS

International Search Report and Written Opinion dated Jan. 26, 2016 from corresponding International Patent Application No. PCT/EP2015/073170.
(Continued)

*Primary Examiner* — Ngoc T Nguyen

(57) ABSTRACT

A supercharging device is disclosed for an internal combustion engine having an exhaust-gas turbocharger and a fresh-air compressor. The supercharging device includes a recuperation charger which has a compressor-turbine with a high-pressure side and a low-pressure side and which has an electromechanical motor-generator coupled to the compressor-turbine. The compressor-turbine is operable at least firstly when the supercharging device is configured in a booster operating mode in a manner driven by the motor-generator as a compressor for increasing the pressure of charge-air mass flow to the intake tract of the engine, and secondly when the supercharging device is configured in a
(Continued)

recuperation operating mode in a manner driven by the charge-air mass flow as a turbine for energy recovery by the motor-generator.

15 Claims, 6 Drawing Sheets

(51) Int. Cl.
  *F02B 33/34* (2006.01)
  *F02B 33/44* (2006.01)
  *F02B 37/00* (2006.01)
  *F02B 37/16* (2006.01)
  *F02B 37/24* (2006.01)
  *F02B 39/10* (2006.01)
  *F02B 37/18* (2006.01)

(52) U.S. Cl.
  CPC ............ *F02B 37/16* (2013.01); *F02B 37/162* (2019.05); *F02B 37/164* (2013.01); *F02B 37/183* (2013.01); *F02B 37/24* (2013.01); *F02B 39/10* (2013.01); *F02M 35/10255* (2013.01); *Y02T 10/144* (2013.01); *Y02T 10/146* (2013.01)

(56) References Cited

U.S. PATENT DOCUMENTS

| | | |
|---|---|---|
| 2001/0054287 A1 | 12/2001 | Hoecker et al. |
| 2004/0194466 A1 | 10/2004 | Kawamura et al. |
| 2012/0079823 A1 | 4/2012 | Son et al. |
| 2012/0210952 A1 | 8/2012 | Reuss et al. |
| 2013/0098031 A1 | 4/2013 | Petrovic et al. |
| 2016/0195047 A1* | 7/2016 | Carter .............. F02M 35/10157 60/605.1 |
| 2017/0198631 A1* | 7/2017 | Zhang .................. F02B 37/005 |
| 2017/0260897 A1* | 9/2017 | Ehrhard .................. F02B 37/04 |

FOREIGN PATENT DOCUMENTS

| | | |
|---|---|---|
| DE | 943203 | 5/1956 |
| DE | 2823067 A1 | 12/1978 |
| DE | 19712850 A1 | 10/1998 |
| DE | 10023022 A1 | 11/2001 |
| DE | 102010035085 A1 | 2/2012 |
| DE | 102010060943 A1 | 4/2012 |
| DE | 102011018570 A1 | 10/2012 |
| DE | 102011084782 A1 | 4/2013 |
| EP | 1391595 A1 | 2/2004 |
| JP | 2007077854 A | 3/2007 |

OTHER PUBLICATIONS

German Office Action dated Oct. 19, 2015 from corresponding German Patent Application No. 10 2014 223 891.9.
Chinese Office Action dated Oct. 18, 2018 for corresponding Chinese Patent Application No. 201580063932.3.
Indian Office Action dated Oct. 17, 2019 for corresponding Indian Patent Application No. 201717011427.

* cited by examiner

SUPERCHARGING DEVICE FOR AN INTERNAL COMBUSTION ENGINE, AND OPERATING METHOD FOR THE SUPERCHARGING DEVICE

CROSS REFERENCE TO RELATED APPLICATIONS

This application claims the benefit of PCT Application PCT/EP2015/073170, filed Oct. 7, 2015, which claims priority to German Application DE 10 2014 223 891.9, filed Nov. 24, 2014. The above applications are incorporated herein by reference.

FIELD OF INVENTION

The invention relates to a supercharging device for an internal combustion engine having an exhaust-gas turbocharger, and to an operating method for the supercharging device.

BACKGROUND

Exhaust-gas turbochargers are increasingly used for increasing power in internal combustion engines, in particular in motor vehicles. This is done ever more commonly with the aim of reducing the structural size and weight of the internal combustion engine while maintaining the same level of power or even achieving an increased level of power, and at the same time reducing consumption and thus $CO_2$ emissions, in the context of ever more stringent legal regulations in this regard. The operating principle utilizes the energy contained in the exhaust-gas flow to increase the pressure in the intake tract of the internal combustion engine and thereby realize improved charging of the combustion chamber with air and/or oxygen, and in order to thus be able to convert more fuel, for example gasoline or diesel, per combustion process, that is to say increase the power of the internal combustion engine.

For this purpose, an exhaust-gas turbocharger has a turbine, which is arranged in the exhaust-gas tract of the internal combustion engine and which has a turbine rotor driven by the exhaust-gas flow, and a compressor, which is arranged in the intake tract and which has a compressor rotor which builds up the pressure. The turbine rotor and compressor rotor are fastened rotationally conjointly to the opposite ends of a rotor shaft and thus form the turbocharger rotor, which is rotatably mounted by means of its rotor shaft in a bearing unit arranged between turbine and compressor. Thus, by means of the exhaust-gas mass flow, the turbine rotor, and via the rotor shaft in turn the compressor rotor, are driven, and the exhaust gas energy is thus utilized for building up pressure in the intake tract.

Turbines and compressors are turbomachines and, owing to the laws of physics, have an optimum operating range in a manner respectively dependent on structural size and design, which optimum operating range is characterized by the mass throughput, the pressure ratio and the rotational speed of the respective rotor.

By contrast to this, the operation of an internal combustion engine in a motor vehicle is characterized by dynamic changes of the load and of the operating range.

To now be able to adapt the operating range of the exhaust-gas turbocharger to changing operating ranges of the internal combustion engine and thus ensure a desired response behavior as far as possible without noticeable decelerations (turbo lag), exhaust-gas turbochargers are equipped with additional functions, such as for example so-called variable turbine geometries (VTG) or wastegate devices (WG) on the exhaust-gas or turbine side and overrun air recirculation or blow-off devices on the air feed or compressor side. These serve for minimizing the inert behavior and thus the decelerated response behavior of the turbocharger and avoiding damaging operating states.

It is also known to use combinations of multiple turbochargers in a parallel or sequential arrangement or to use additional compressors which are operated mechanically or by electric motor, so-called supercharging blowers or superchargers, in order to cover the various operating conditions of the internal combustion engine, in order to efficiently increase the power in all rotational speed ranges and in particular during acceleration processes, and in particular to avoid the undesired turbo lag, which is caused by excessively low charge pressure in low rotational speed ranges of the turbocharger in conjunction with the inertia of the turbocharger rotor.

A supercharging device of said type, which has a conventional exhaust-gas turbocharger and an auxiliary compressor arranged in the fresh-air mass flow in series or in parallel with respect to the turbocharger compressor, which auxiliary compressor has a drive independent of the exhaust-gas flow, for example an electric motor drive, is disclosed, for example, in DE 100 23 022 A1.

By contrast, in operating phases in which the power of the internal combustion engine is decreased quickly, it is the case, likewise owing to the inertia of the turbocharger, that an excess of compressor power exists, which can lead to so-called compressor surging. Compressor surging refers to an operating state in which air that has already been compressed flows back from the high-pressure side of the compressor via the compressor rotor in periodic surges and thus generates undesired oscillations in the intake tract. To avoid such operating states, exhaust gas is conducted, so as to bypass the turbine of the turbocharger, into the exhaust-gas tract, for example by means of a wastegate device, and already-compressed fresh air is blown off downstream of the compressor or is expanded across an overrun air recirculation device and recirculated into the intake region. The arrangement and functioning of an overrun air recirculation valve of said type is known, for example, from documents DE 28 23 067 C2 and DE 19712850 A1.

In this way, the available energy is discharged, unutilized, into the surroundings, which has an adverse effect on the overall energy balance and thus on the efficiency of the internal combustion engine.

SUMMARY

Embodiments of the present invention are based on a supercharging device and an operating method therefor for an internal combustion engine, which are suitable both for assisting the build-up of charge pressure by means of the exhaust-gas turbocharger in acceleration or peak-load phases of the internal combustion engine and for utilizing, or making utilizable, in the overall system of the motor vehicle, the excess energy in the supercharging system during braking or low-load phases of the internal combustion engine, and thereby increasing the efficiency of the internal combustion engine.

A corresponding internal combustion engine self-evidently has an intake side, via which it draws in fresh air or a fuel-fresh air mixture, and an exhaust-gas side, via which it releases the exhaust gas that has been generated after the combustion. An internal combustion engine of said type may be a single-cylinder or multi-cylinder reciprocating-piston engine which is operated with fuels such as, for example, gasoline, diesel or a combustible gas.

The supercharging device, according to embodiments of the invention, for an internal combustion engine which has an intake tract arranged on its intake side and an exhaust-gas tract arranged on its exhaust-gas side, has an exhaust-gas turbocharger including an exhaust-gas turbine, which is arranged in the exhaust-gas tract, and a fresh-air compressor having a low-pressure side and a high-pressure side, which is arranged in the intake tract. The fresh-air compressor is connected, on its low-pressure side, to a fresh-air supply device, and is connected, on its high-pressure side, via a charge-air feed line, which serves for conducting a charge-air mass flow generated by the fresh-air compressor, to the intake side of the internal combustion engine, for example via a throttle flap valve and a charge-air manifold.

The supercharging device is distinguished by the additional arrangement of a recuperation charger which has a compressor-turbine with a high-pressure side and a low-pressure side and which has an electromechanical motor-generator coupled to the compressor-turbine. Here, the compressor-turbine is coupled via line connections and valve devices to the charge-air feed line such that the recuperation charger is operable in a manner dependent on the settings of the valve devices, at least firstly in a booster operating mode, in a manner driven by the motor-generator as a compressor for increasing the pressure of the charge-air mass flow in the charge-air feed line; and secondly in a recuperation operating mode, in a manner driven by the charge-air mass flow as a turbine for energy recovery by means of the motor-generator. It may furthermore be provided that, in a standard operating mode, the motor-generator may be switched into a neutral state, that is to say in effect into idle operation, and the charge-air mass flow is conducted directly from the fresh-air compressor of the exhaust-gas turbocharger to the intake side of the internal combustion engine.

Here, the expression "recuperation charger" is to be understood to mean a device which combines an impeller-type turbine with connected generator and an impeller-type compressor with connected electric motor in one device. Thus, an impeller-type turbine and an impeller-type compressor are combined in one rotor and an associated housing to form what is referred to above and also below as a compressor-turbine as a unit. Likewise, the electric motor and the generator are combined in one three-phase machine to form what is referred to above and also below as a motor-generator as a unit. The compressor-turbine and the motor-generator are coupled to one another directly or via an interposed gearing and form, as a unit, the recuperation charger.

In designing the compressor-turbine, use is made of the characteristic of impellers whereby, firstly, when impinged on by a flow of a fluid at elevated pressure from the high-pressure side, they may act as a turbine and generate an output torque and, secondly, when driven by a drive torque, they may generate a fluid flow with increase of the pressure and thus act as a compressor. The design of the corresponding impeller and the flow guidance in the rotor housing therefore, for the use as a compressor-turbine, allows for both intended uses. This may, in an advantageous refinement of the compressor-turbine, be optimized by means of a fixed or variable arrangement of flow-guiding guide blades.

In designing the motor-generator, use is made of the characteristic of electric three-phase machines whereby, firstly, when a voltage and current is applied thereto, they may be operated as an electric motor with driving action and, secondly, when driven by an external torque, they may generate voltage and output current. The design of the corresponding three-phase machine for use as a motor-generator therefore allows for both intended uses.

The advantageous combination of compressor-turbine and motor-generator to form what is referred to above and also below as a recuperation charger advantageously permits operation of the compressor-turbine in both flow directions, specifically as a compressor in a booster operating mode when driven by electric motor action or as a turbine, so as to drive the generator, in a recuperation operating mode. A further possibility includes switching the motor-generator into a neutral state, which corresponds to a freewheeling state of the compressor-turbine and can be utilized in what is referred to here and below as a standard operating mode.

An advantageously configured embodiment of the supercharging device is distinguished by the fact that the low-pressure side of the compressor-turbine is connected, at least via a low-pressure branch line and a first valve device, to the charge-air feed line at a first charge-air branching point, and the high-pressure side of the compressor-turbine is connected, at least via a high-pressure branch line and a second valve device, to the charge-air feed line at a second charge-air branching point downstream of the first charge-air branching point in the charge-air flow, wherein the charge-air feed line may be shut off between the first charge-air branching point and the second charge-air branching point by means of the first or second valve device or at least one further valve device. This configuration has the advantage that the flow direction of the charge-air mass flow via the compressor-turbine may be particularly easily reversed in order to switch from the booster operating mode to the recuperation operating mode.

The operating method, according to embodiments of the invention, for a supercharging device of an internal combustion engine according to the above description is such that the supercharging device may, during operation, be switched at least between a booster operating mode and a recuperation operating mode in a manner dependent on the operating behavior of the internal combustion engine and by means of the line connections, the valve devices and the motor-generator of the recuperation charger. Furthermore, a standard operating mode may additionally and advantageously be provided, which may likewise be switched to in a manner dependent on the operating behavior of the internal combustion engine.

For example, a switch is made to the booster operating mode of the supercharging device in the event of a demand for increased rotational speed or in the presence of elevated load of the internal combustion engine. For this purpose, the charge-air mass flow is conducted from the high-pressure side of the fresh-air compressor to the low-pressure side of the compressor-turbine and from the high-pressure side of the compressor-turbine back into the charge-air feed line and thus to the intake side of the internal combustion engine, and the motor-generator is switched into a motor mode so as to drive the compressor-turbine for the purposes of increasing the pressure in the charge-air feed line.

If, on the other hand, a rapid decrease in power of the internal combustion engine is necessary or the charge-air mass flow which is or may be generated by the fresh-air compressor of the exhaust-gas turbocharger is not fully required in low-load operation, a switch may be made into the recuperation operating mode of the supercharging device. To implement the recuperation operating mode, the charge-air mass flow is expanded from the high-pressure side of the fresh-air compressor at least partially to the high-pressure side of the compressor-turbine across the compressor-turbine and is blown off from the low-pressure side of the compressor-turbine via a blow-off port into the surroundings, or is introduced via a recirculation line into the fresh-air supply device or is conducted onward to the intake side of the internal combustion engine, and the motor-generator is switched into a generator mode so as to be driven by the compressor-turbine for the purposes of energy recovery.

Now, the charge-air mass flow not required by the internal combustion engine is conducted at high pressure to the compressor-turbine and thus drives the motor-generator, which in turn converts the imparted torque into electrical energy which may be supplied directly to a consumer in the vehicle or to an accumulator. Thus, the excess energy in the supercharging device is not released unutilized to the surroundings, but rather may be supplied for more expedient use, possibly at a later point in time.

If a standard operating mode is provided as a further operating mode, and if the internal combustion engine is operated, for example, at medium, constant load, the supercharging device may be switched into the standard operating mode. To implement the standard operating mode, the charge-air mass flow is conducted from the high-pressure side of the fresh-air compressor via the charge-air feed line directly to the intake side of the internal combustion engine by correspondingly setting the valve devices, and the motor-generator of the recuperation charger is switched into a neutral state.

The advantages of the supercharging device, according to embodiments of the invention, and of the corresponding operating method lie in particular in that, depending on the operating situation of the internal combustion engine aside from the standard or normal operating mode, a fast increase of torque and thus rotational speed are made possible while avoiding "turbo lag", and in the opposite case of a fast decrease in power, excess energy does not have to be dissipated unutilized, but rather may be made utilizable.

In a further refinement of the supercharging device, one or more charge-air coolers are arranged at one or more positions in the charge-air feed line upstream or downstream of the compressor-turbine in the charge-air mass flow. This has an advantageous effect on the operating temperatures of the functional components arranged in the charge-air mass flow, and yields further improved charging of the cylinders of the internal combustion engine with oxygen.

In a further refinement of the supercharging device, the compressor-turbine of the recuperation charger has a compressor-turbine housing with, arranged therein, a fixed or variable guide blade arrangement for improving or optimizing the outflow behavior or inflow behavior of the charge-air mass flow. In particular, a variable guide blade arrangement offers the advantage that the power and efficiency of the compressor-turbine in the respective operating mode may be increased through adaptation of the flow direction of the charge-air mass flow, for example.

In a further refinement of the supercharging device, the fresh-air supply device has a fresh-air supply line and a fresh-air filter device. In this way, it is advantageously ensured that no damaging dirt particles are drawn in by the fresh-air compressor of the exhaust-gas turbocharger and transported into the supercharging device.

Below, particularly advantageous example embodiments and refinements of the invention will be discussed in more detail on the basis of the figures which take the form of simplified schematic illustrations, even though the subject matter of the invention is not restricted to these examples and in particular to the combinations of features presented therein.

BRIEF DESCRIPTION OF THE DRAWINGS

Example embodiments of the invention are described in detail hereinunder with reference to the attached schematic figures. In the figures.

DETAILED DESCRIPTION

Items of identical function and designation are denoted by the same reference designations throughout the figures.

Figure 1:
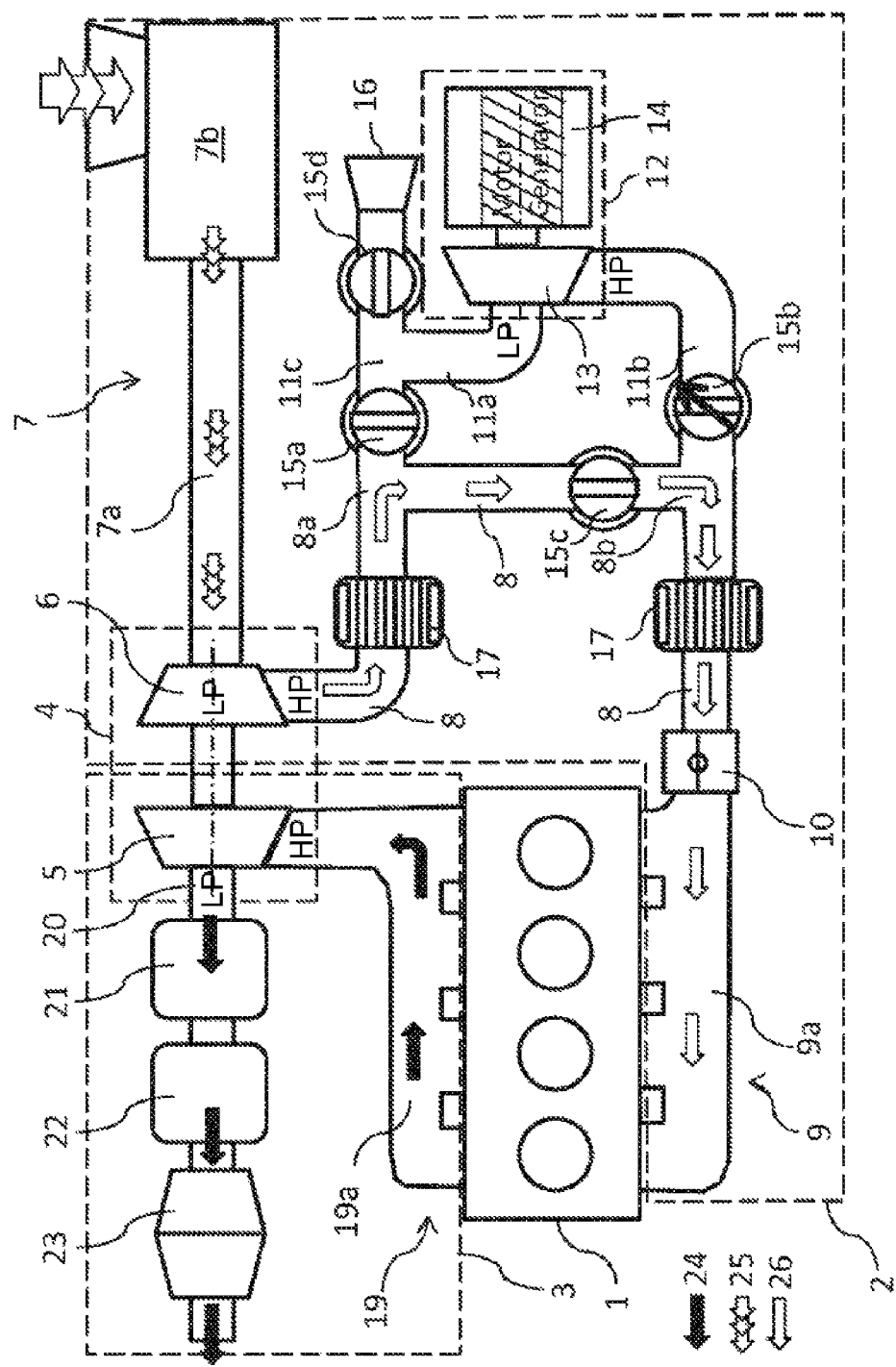
FIG. 1 shows a first example embodiment of the supercharging device in conjunction with an internal combustion engine in the standard operating mode.

The example embodiment of the invention in FIG. 1 shows, in a schematically simplified illustration, an internal combustion engine 1, illustrated in this case schematically as a four-cylinder in-line reciprocating-piston engine, having an intake tract 2 arranged on the intake side 9 and having an exhaust-gas tract 3 arranged on the exhaust-gas side 19. Also illustrated is an exhaust-gas turbocharger 4 with an exhaust-gas turbine 5 in the exhaust-gas tract 3 and a fresh-air compressor 6 in the intake tract 2 and a so-called recuperation charger 12, which has a compressor-turbine 13 and an electromechanical motor-generator 14.

The exhaust-gas tract 3 includes an exhaust-gas manifold 19a, which is connected on the exhaust-gas side 19 to the internal combustion engine 1; the exhaust-gas turbine 5, which is connected on its high-pressure side HP to the exhaust-gas manifold 19a; an exhaust-gas discharge line 20, which is connected to the low-pressure side LP of the exhaust-gas turbine 5; and an exhaust-gas catalytic converter 21, a soot particle filter 22 and a silencer 23, which are arranged along the exhaust-gas discharge line 20. The exhaust-gas mass flow 24 (illustrated by darkened arrows) discharged from the internal combustion engine 1 is discharged from the exhaust-gas manifold 19a via the exhaust-gas turbine 5 into the exhaust-gas discharge line 20 and through exhaust-gas catalytic converter 21, soot particle filter 22 and silencer 23 into the surroundings.

The intake tract 2 includes a charge-air manifold 9a, which is connected on the intake side 9 to the internal combustion engine 1; the fresh-air compressor 6 of the exhaust-gas turbocharger 4; and a charge-air feed line 8, which is connected at one side and/or end via a throttle flap valve 10 to the charge-air manifold 9a and which is connected at the other side to the high-pressure side HP of the fresh-air compressor 6. Furthermore, the intake tract 2 comprises a fresh-air supply device 7 with a fresh-air supply line 7a and a fresh-air filter device 7b. The fresh-air supply line 7a is connected at one side to the low-pressure side LP of the fresh-air compressor 6 and at the other side to the fresh-air filter device 7b. Likewise assigned to the intake tract 2 is the recuperation charger 12 which has the compressor-turbine 13 and, coupled thereto, the motor-generator 14. The low-pressure side LP of the compressor-turbine 13 is connected via a low-pressure branch line 11a to the charge-air feed line 8 at a first charge-air branching point 8a. Furthermore, a blow-off port 16 is connected to the low-pressure branch line 11a at a low-pressure branching point 11c. To the high-pressure side HP of the compressor-turbine 13 there is connected a high-pressure branch line 11b, which is in turn connected to the charge-air feed line 8 at a second charge-air branching point 8b, which is downstream of the first charge-air branching point 8a in the charge-air mass flow 26.

Furthermore, multiple valve devices 15a-15d for controlling the charge-air mass flow 26 are arranged in the abovementioned line connections 8, 11a and 11b.

A first valve device 15a is arranged in the low-pressure branch line 11a between the first charge-air branching point 8a and the low-pressure branching point 11c, and a second valve device 15b is arranged in the high-pressure branch line 11b between the compressor-turbine 13 and the second charge-air branching point 8b. In the charge-air feed line 8, a further valve device 15c is arranged between the first and the second charge-air branching point 8a, 8b, and a further valve device 15d is arranged between the low-pressure branching point 11c and the blow-off port 16. The valve devices 15a-15d may all be in the form of simple shut-off valves which may assume the two states "shut off" and "open". With a valve arrangement of this type, it is possible to switch between the three operating modes—standard operating mode, booster operating mode and recuperation operating mode. Transition operation, in the case of which only a part of the charge-air mass flow 26 is conducted via the compressor-turbine 13 for recuperation purposes, is thus not possible. However, if the second valve device 15b is a proportional valve, as is schematically illustrated in FIG. 1, it is possible, proceeding from the shut-off valve position in the purely standard operating mode, for a variable fraction of the charge-air mass flow 26 to be conducted to the compressor-turbine 13 through regulated partial opening in any desired valve intermediate position.

FIG. 1 illustrates the example embodiment of the supercharging device with a valve position as per the standard operating mode, which is set when the internal combustion engine 1 is running at more or less constant load in a more or less constant low to medium rotational speed band. Here, the first and the second valve device 15a, 15b and thus the low-pressure branch line 11a and the high-pressure branch line 11b are shut off, wherein at the same time, the further valve device 15c in the charge-air feed line is open. The further valve device 15d toward the blow-off port 16 may in this case be set to be either open or shut off. Thus, the passage from the first charge-air branching point 8a toward the low-pressure side LP of the compressor-turbine 13 and the passage from the high-pressure branch line 11b toward the charge-air feed line 8 are closed, and the passage of the charge-air feed line 8 from the low-pressure side LP of the fresh-air compressor 6 toward the intake side 9 of the internal combustion engine 1 is opened.

In the standard operating mode, therefore, a fresh-air mass flow 25, illustrated in FIG. 1 by triple arrows, is drawn in via the fresh-air filter device 7b and the fresh-air supply line 7a.

In the fresh-air compressor 6 of the exhaust-gas turbocharger 4, the fresh-air mass flow 25 is compressed and is, on the high-pressure side HP of the fresh-air compressor 6, pumped at elevated pressure into the charge-air feed line 8, and via the at least partially opened throttle flap valve 10 and the charge-air manifold 9a, into the cylinders of the internal combustion engine 1. The air mass flow discharged on the high-pressure side HP of the fresh-air compressor 6 is then referred to in this context as charge-air mass flow 26, which is intended to indicate the elevated pressure level.

Furthermore, to implement the standard operating mode, the charge-air mass flow 26 is conducted from the high-pressure side HP of the fresh-air compressor 6 via the charge-air feed line 8 directly to the intake side 9 of the internal combustion engine, and the motor-generator 14 of the recuperation charger 12 is switched into a neutral state, which is indicated in FIG. 1 by the fact that both the "motor" label and the "generator" label have been struck through.

Proceeding from the standard operating mode, a switch may be easily made to the recuperation operating mode by virtue of the further valve device 15d being opened toward the blow-off port, the motor-generator being switched into the generator mode, and then the second valve device 15b being opened. In the case of a proportional valve 15b being used, the opening may be performed in progressively or else only partially regulated fashion in order to branch off exactly that fraction of the charge-air mass flow 26 which is not presently required by the internal combustion engine.

To implement the booster operating mode, the first and the second valve devices 15a, 15b are switched into an open state, and the two further valve devices 15c, 15d in the charge-air feed line 8 and toward the blow-off port 16, respectively, are shut off.

By means of corresponding valve settings of the valve devices 15a, 15b, 15c, 15d, it is thus possible for the flow direction of the charge-air mass flow 26, illustrated in this case by the light arrows, via the compressor-turbine 13 to be switched.

The embodiment of the supercharging device as per FIG. 1 has the advantage here that use can be made of valve devices which are particularly simple from mechanical and control aspects, and which makes it possible to realize a robust and inexpensive construction.

Figure 2:
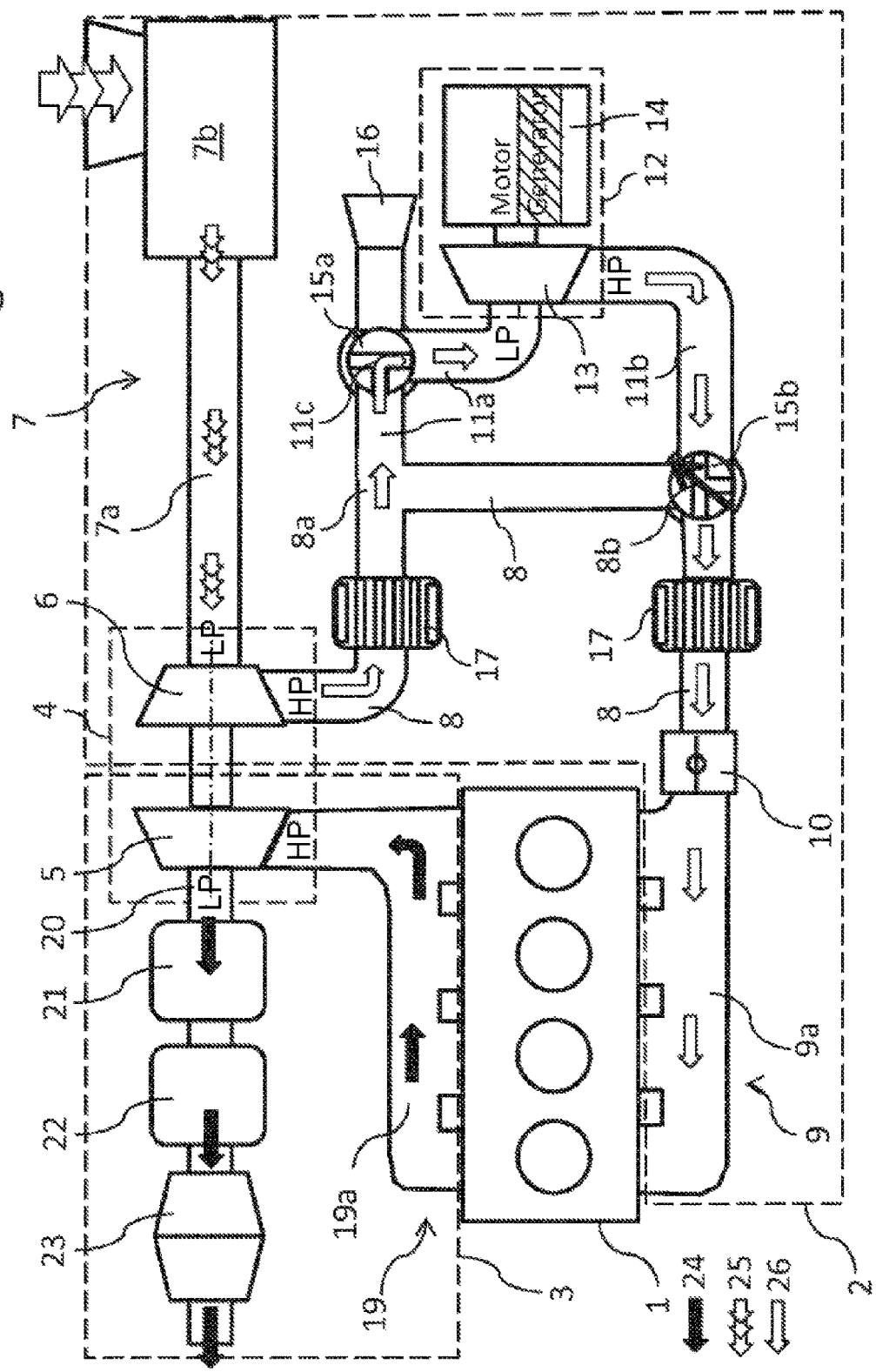
FIG. 2 shows the first example embodiment of the supercharging device with different valve devices in the booster operating mode.

FIG. 2 shows, with regard to the overall arrangement and in particular the line connections 8, 11a, 11b, the same arrangement as FIG. 1 but with a different embodiment and arrangement of the valve devices, wherein the valve settings shown correspond to the booster operating mode.

The embodiment of the supercharging device shown in FIG. 2 is distinguished by the fact that the first valve device 15a and the second valve device 15b are each designed as switching valves, whereby it is possible to dispense with further valve devices. Furthermore, the second valve device 15b is designed as a proportional valve 15b (indicated by arrow), whereby partial switching, and thus a distribution of the charge-air mass flow 26, are made possible. The use of a proportional valve is, however, not necessary if complete switching between the operating modes is sufficient.

Here, the first valve device 15a is arranged at the low-pressure branching point 11c, wherein in a valve position (not illustrated) with a closed passage from the first charge-air branching point 8a to the low-pressure side LP of the compressor-turbine 13, the passage from the low-pressure side LP of the compressor-turbine 13 to the blow-off port 16 or the recirculation line 16a is open (see FIG. 3); and in a further valve position, which is illustrated in FIG. 2, with an open passage from the first charge-air branch point 8a to the low-pressure side LP of the compressor-turbine 13, the passage to the blow-off port 16 or the recirculation line 16a is closed.

The second valve device 15b is arranged at the second charge-air branching point 8b, wherein in a valve position with an open passage of the charge-air feed line 8 to the intake side 9 of the internal combustion engine 1, the passage from the charge-air feed line 8 to the high-pressure branch line 11b is at least partially closed (not illustrated in FIG. 2), and in a further valve position with a closed passage of the charge-air feed line 8 to the intake side 9 of the internal combustion engine 1 and to the high-pressure branch line 11b, the passage from the high-pressure branch line 11b to the intake side 9 of the internal combustion engine 1 is open, as shown in FIG. 2, and in a further valve position with an open passage of the charge-air feed line 8 from the high-pressure side HP of the fresh-air compressor 6 to the high-pressure branch line 11b, the passage of the charge-air feed line 8 to the intake side 9 of the internal combustion engine 1 is at least partially closed.

In the booster operating mode illustrated in FIG. 2, the passage from the first charge-air branch point 8a to the low-pressure side LP of the compressor-turbine 13 is open, and the passage to the blow-off port 16 or the recirculation line 16a (see FIG. 3) is closed. At the same time, the passage from the high-pressure branch line 11b to the charge-air feed line 8 is open, and the passage of the charge-air feed line 8 is closed at the second charge-air branching point 8b. At the same time, the motor-generator 14 is switched to motor operation (only the "generator" label has been struck through).

Thus, in the booster operating mode, the charge-air mass flow 26 is conducted from the high-pressure side HP of the fresh-air compressor 6 to the low-pressure side LP of the compressor-turbine 13, is compressed further by the latter, and is conducted from the high-pressure side HP of the compressor-turbine 13 back into the charge-air feed line 8 and to the intake side 9 of the internal combustion engine 1. The motor-generator 14, in the motor mode, drives the compressor-turbine 13 for the purposes of increasing the pressure in the charge-air feed line 8.

Figure 3:
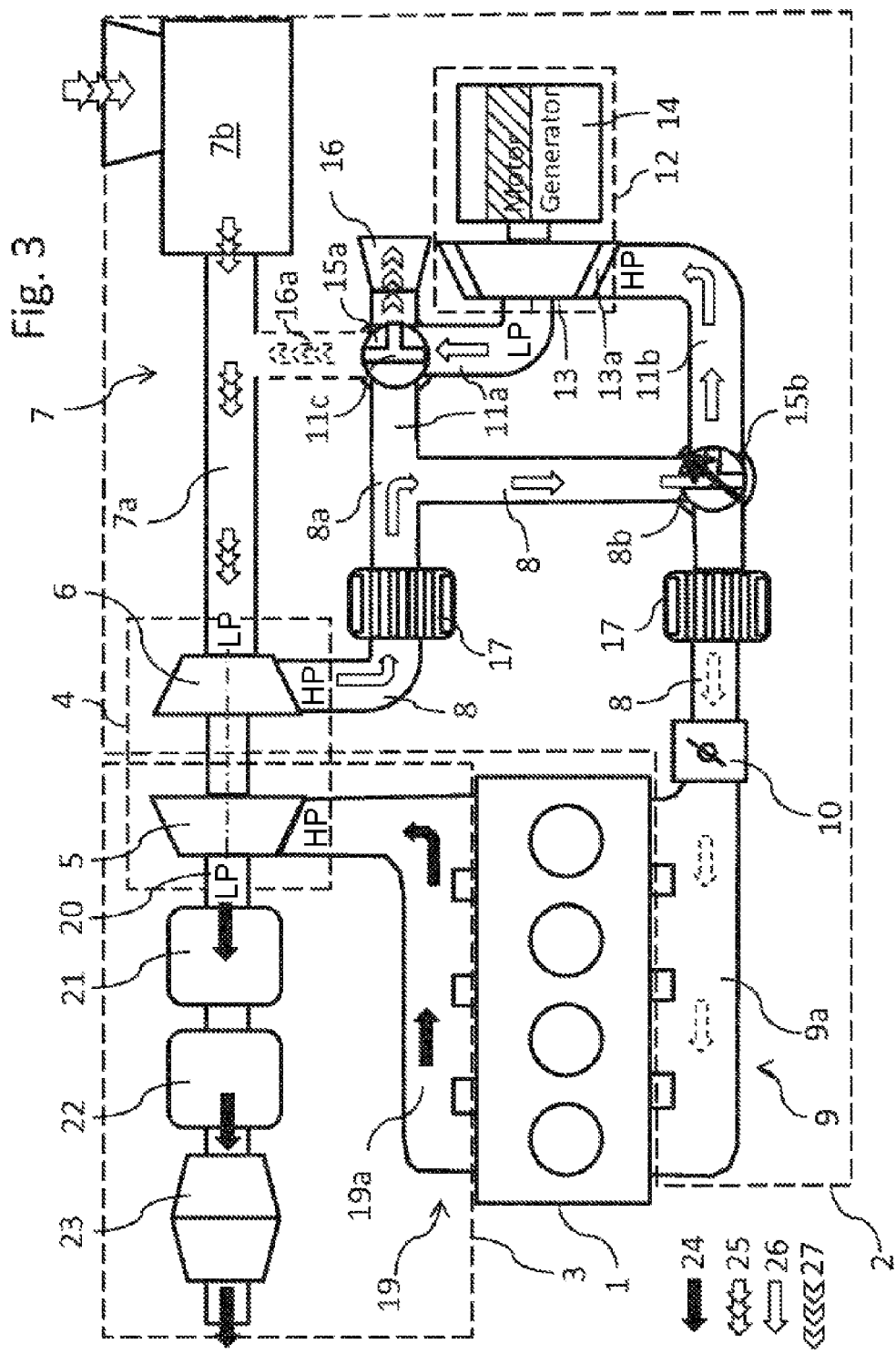
FIG. 3 shows the first example embodiment of the supercharging device as per FIG. 2, but in the recuperation operating mode.

FIG. 3 illustrates the same arrangement of the supercharging device as in FIG. 2, but the two switching valves 15a, 15b are situated in the setting that corresponds to the recuperation operating mode. Furthermore, FIG. 3 additionally indicates the recirculation line 16a, indicated by dashed lines, which may be provided instead of a blow-off port 16 and which recirculates the blown-off mass flow 27 into the air circuit upstream of the fresh-air compressor 6. Furthermore, FIG. 3 also symbolically illustrates the arrangement of a fixed or variable guide blade arrangement 13a.

To implement the recuperation operating mode, the passage from the first charge-air branch point 8a toward the low-pressure side LP of the compressor-turbine 13 and toward the blow-off port 16 or the recirculation line 16a is closed, and the passage from the second charge-air branch point 8b toward the high-pressure side HP of the compressor-turbine 13 is at least partially open, and the passage from the low-pressure side LP of the compressor-turbine 13 toward the blow-off port 16 or the recirculation line 16a is open. The motor-generator 14 is at the same time switched to generator operation ("motor" label struck through).

To implement the recuperation operating mode, the charge-air mass flow 26 is thus blown off from the high-pressure side HP of the fresh-air compressor 6 at least partially to the high-pressure side HP of the compressor-turbine 13 and from the low-pressure side LP of the compressor-turbine 13 via a blow-off port 16 into the surroundings, or introduced via a recirculation line 16a into the fresh-air supply device 7, wherein the motor-generator 14 is driven by the compressor-turbine 13 for the purposes of energy recovery.

The embodiment of the supercharging device as per FIGS. 2 and 3 has the advantage here that the number of mechanical components required and thus also the structural space required for the supercharging device are reduced.

The supercharging devices illustrated in FIGS. 1, 2 and 3 further include two charge-air coolers 17 arranged at two different positions in the charge-air feed line 8 in the charge-air mass flow 26. A charge-air cooler 17 is arranged between the high-pressure side HP of the fresh-air compressor 6 and the first charge-air branching point 8a, and the second charge-air cooler 17 is arranged between the second charge-air branching point 8b and the throttle flap valve 10. This advantageously yields two-stage charge-air cooling for the standard operating mode and the booster operating mode, and in the recuperation operating mode, a cooled charge-air mass flow 26 is conducted to the compressor-turbine 13. An expensive design of the compressor-turbine 13 for elevated operating temperatures is thus not necessary.

Figure 4:
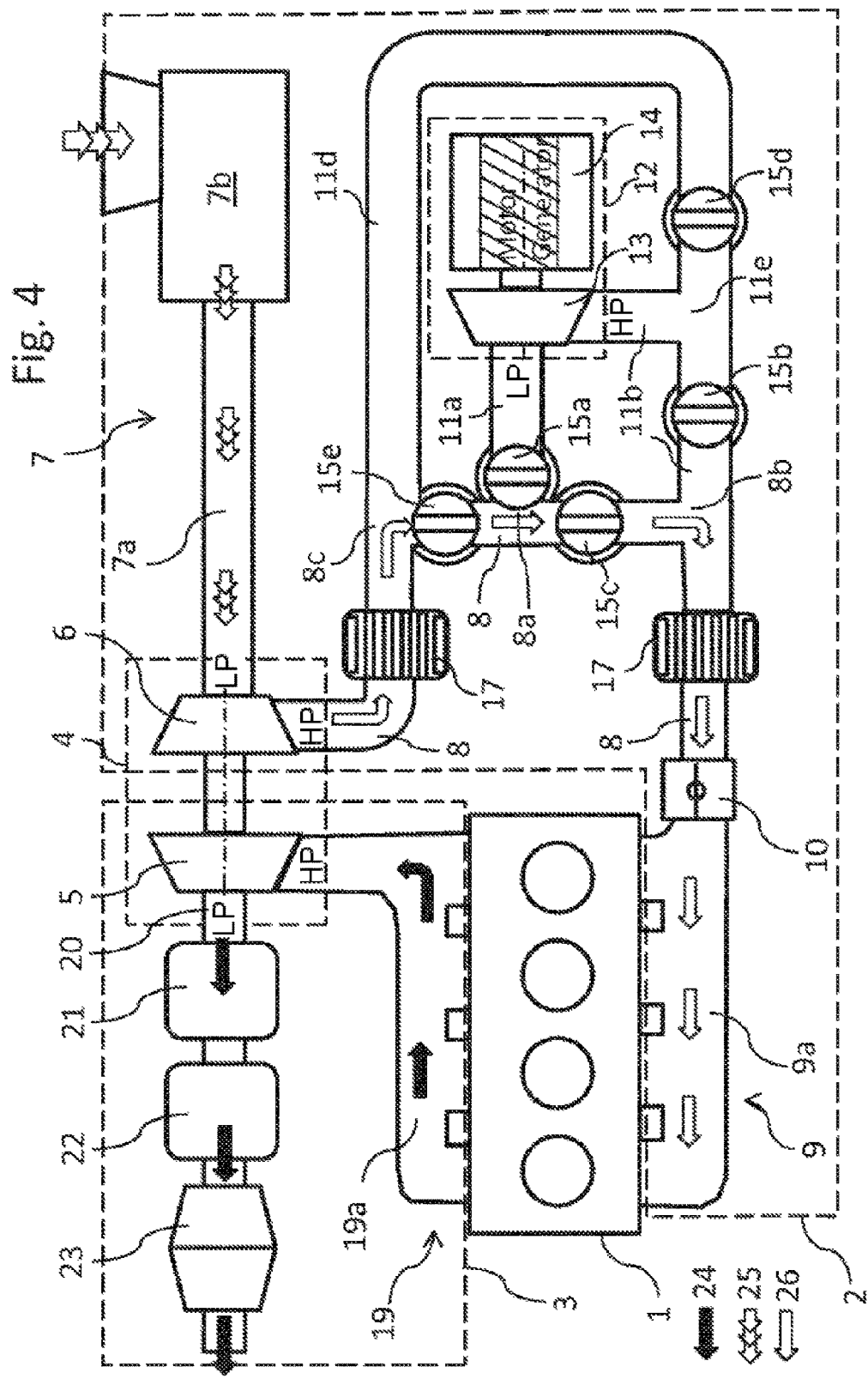
FIG. 4 shows a further example embodiment of the supercharging device with a different arrangement of the line connections and valve devices, in the standard operating mode.

FIG. 4 shows a further embodiment of the invention of the supercharging device with a modified arrangement of the line connections and valve devices in relation to the examples from FIGS. 1 to 3.

The supercharging device illustrated in FIG. 4 is such that, in relation to the examples above of FIGS. 1 to 3, a blow-off port 16 and/or a recirculation line 16a are dispensed with, and instead, a charge-air bypass line 11d is provided.

In this example, too, the intake tract 2 includes a charge-air manifold 9a, which is connected on the intake side 9 to the internal combustion engine 1, the fresh-air compressor 6 of the exhaust-gas turbocharger 4, and a charge-air feed line 8, which is connected at one side via a throttle flap valve 10 to the charge-air manifold 9a and which is connected at the other side to the high-pressure side HP of the fresh-air compressor 6. Furthermore, the intake tract 2 comprises a fresh-air supply device 7 with a fresh-air supply line 7a, which is connected at one side to the low-pressure side LP of the fresh-air compressor 6 and at the other side to a fresh-air filter device 7b. Likewise assigned to the intake tract 2 is a recuperation charger 12 which has a compressor-turbine 13 and, coupled thereto, a motor-generator 14. The low-pressure side LP of the compressor-turbine 13 is, in this example too, connected via a low-pressure branch line 11a to the charge-air feed line 8 at a first charge-air branching point 8a. To the high-pressure side HP of the compressor-turbine 13 there is connected a high-pressure branch line 11b, which is in turn connected to the charge-air supply line 8 at a second charge-air branching point 8b, which is downstream in the charge-air mass flow 26.

The charge-air bypass line 11d is connected at one side to the charge-air feed line 8 at a third charge-air branching point 8c upstream of the first charge-air branching point 8a in the charge-air mass flow 26, and is connected at the other side to the high-pressure branch line 11b at a high-pressure branching point 11e.

Furthermore, multiple valve devices 15a-15d for controlling the charge-air mass flow 26 are arranged in the abovementioned line connections 8, 11a, 11b and 11d. A first valve device 15a is arranged in the low-pressure branch line 11a between the first charge-air branching point 8a and the low-pressure side LP, and a second valve device 15b is arranged in the high-pressure branch line 11b between the compressor-turbine 13 and the second charge-air branching point 8b. Furthermore, in the charge-air feed line 8, a further valve device 15c is arranged between the first and the second charge-air branching point 8a, 8b, which thus far corresponds in principle to the arrangement from FIG. 1.

Furthermore, a further valve device 15e is arranged in the charge-air feed line 8 between the third charge-air branching point 8c and the first charge-air branching point 8a, and a further valve device 15d is arranged in the charge-air bypass line 11d between the third charge-air branching point 8c and the high-pressure branching point 11e. Thus, the charge-air feed line 8 may be shut off from the first charge-air branching point 8a toward the second charge-air branching point 8b by means of the abovementioned further valve device 15c and from the first charge-air branching point 8a toward the third charge-air branching point 8c by means of the abovementioned further valve device 15e.

The abovementioned valve devices 15a-15e in FIG. 4 may all be in the form of simple shut-off valves which may assume the two states "shut off" and "open". With a valve arrangement of this type, it is possible to switch between the three operating modes—the standard operating mode, the booster operating mode and the recuperation operating mode. Transition operation, in the case of which only a part of the charge-air mass flow 26 is conducted via the compressor-turbine 13 for recuperation purposes, is thus not possible.

The valve settings illustrated in FIG. 4 define the standard operating mode, in which only the two further valve devices 15c and 15e arranged in the charge-air feed line 8 are open and the remaining valve devices 15a, 15b, 15d are shut off. Here, the setting of the further valve device 15d is not of significance, because the flow paths from the charge-air feed line 8 to the compressor-turbine 13 are in any case already shut off in both directions by means of the first and the second valve device 15a, 15b.

Thus, to implement the standard operating mode, the passage of the charge-air feed line 8 from the high-pressure side HP of the fresh-air compressor 6 to the intake side 9 of the internal combustion engine 1 is open, and the passage of the low-pressure branch line 11a toward the low-pressure side LP of the compressor-turbine 13 and the passage of the high-pressure branch line 11b toward the charge-air feed line 8 are closed.

In this way, the charge-air mass flow 26 is conducted from the high-pressure side HP of the fresh-air compressor 6 via the charge-air feed line 8 to the intake side 9 of the internal combustion engine directly, that is to say not via the compressor-turbine 13, via the throttle flap valve 10 and the intake manifold 9a, wherein the motor-generator 14 of the recuperation charger 12 is switched into a neutral state.

Figure 5:
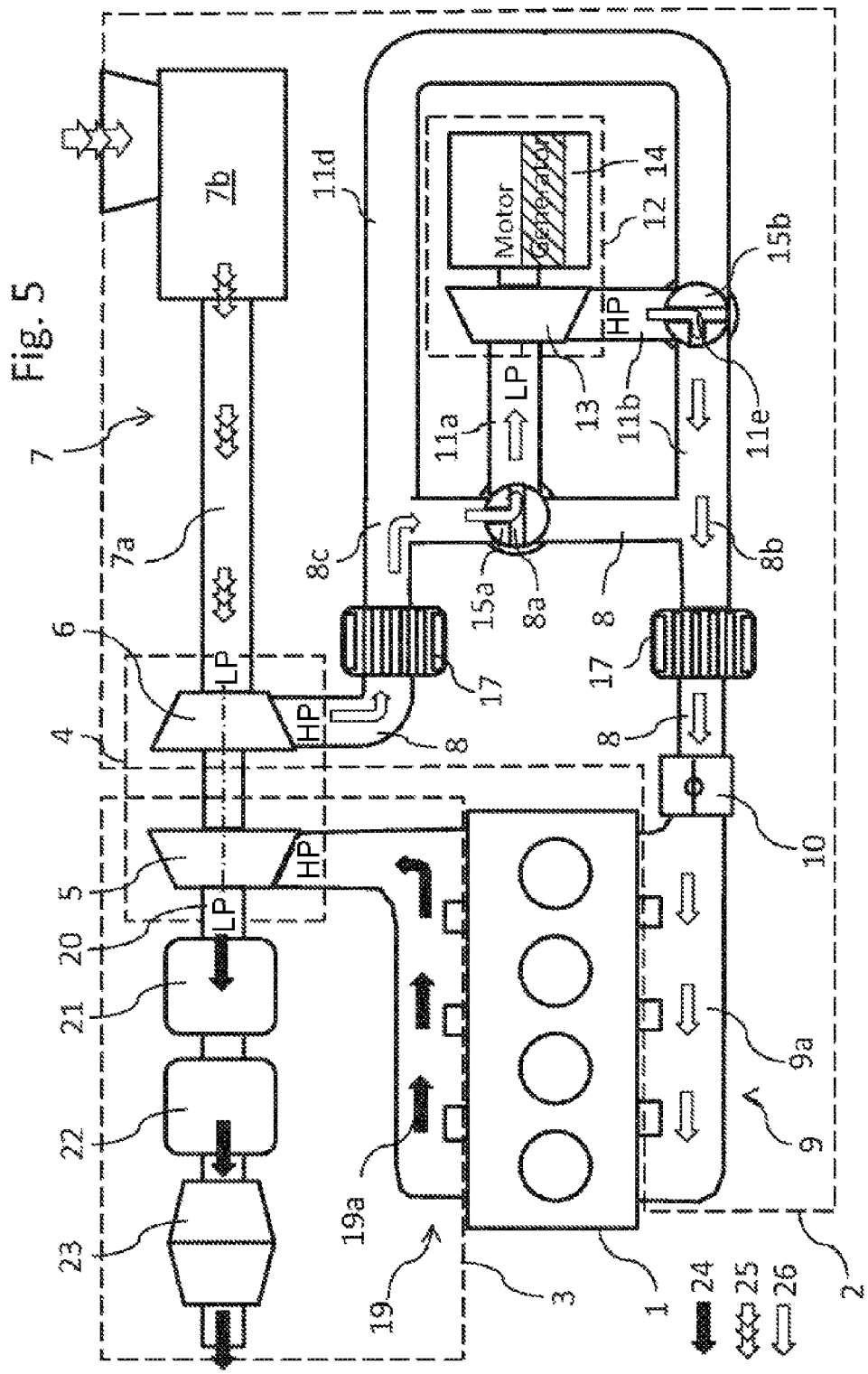
FIG. 5 shows the further example embodiment of the supercharging device with different valve devices in the booster operating mode.

FIG. 5 shows substantially the same embodiment of the supercharging device as FIG. 4, with only the design and the arrangement of the valve devices differing, and the illustrated settings of the valve devices 15a, 15b defining the booster operating mode.

The embodiment of the supercharging device illustrated in FIG. 5 is defined in that the first and the second valve device 15a are switching valves 15a, 15b.

Here, the first valve device 15a is arranged at the first charge-air branching point 8a, wherein in a valve position with a closed passage from the first charge-air branching point 8a toward the low-pressure branch line 11a, the passage of the charge-air feed line 8 from the high-pressure side HP of the fresh-air compressor 6 to the intake side 9 of the internal combustion engine 1 is open (not illustrated in FIG. 5). In a further valve position with a closed passage from the first charge-air branching point 8a toward the intake side 9 of the internal combustion engine 1, the passage from the high-pressure side HP of the fresh-air compressor 6 toward the low-pressure branch line 11a is open, as illustrated in FIG. 5. In a further valve position with a closed passage of the charge-air feed line 8 from the first charge-air branching point 8a toward the high-pressure side HP of the fresh-air compressor, the passage from the low-pressure branch line 11a toward the intake side 9 is open (see FIG. 6).

Figure 6:
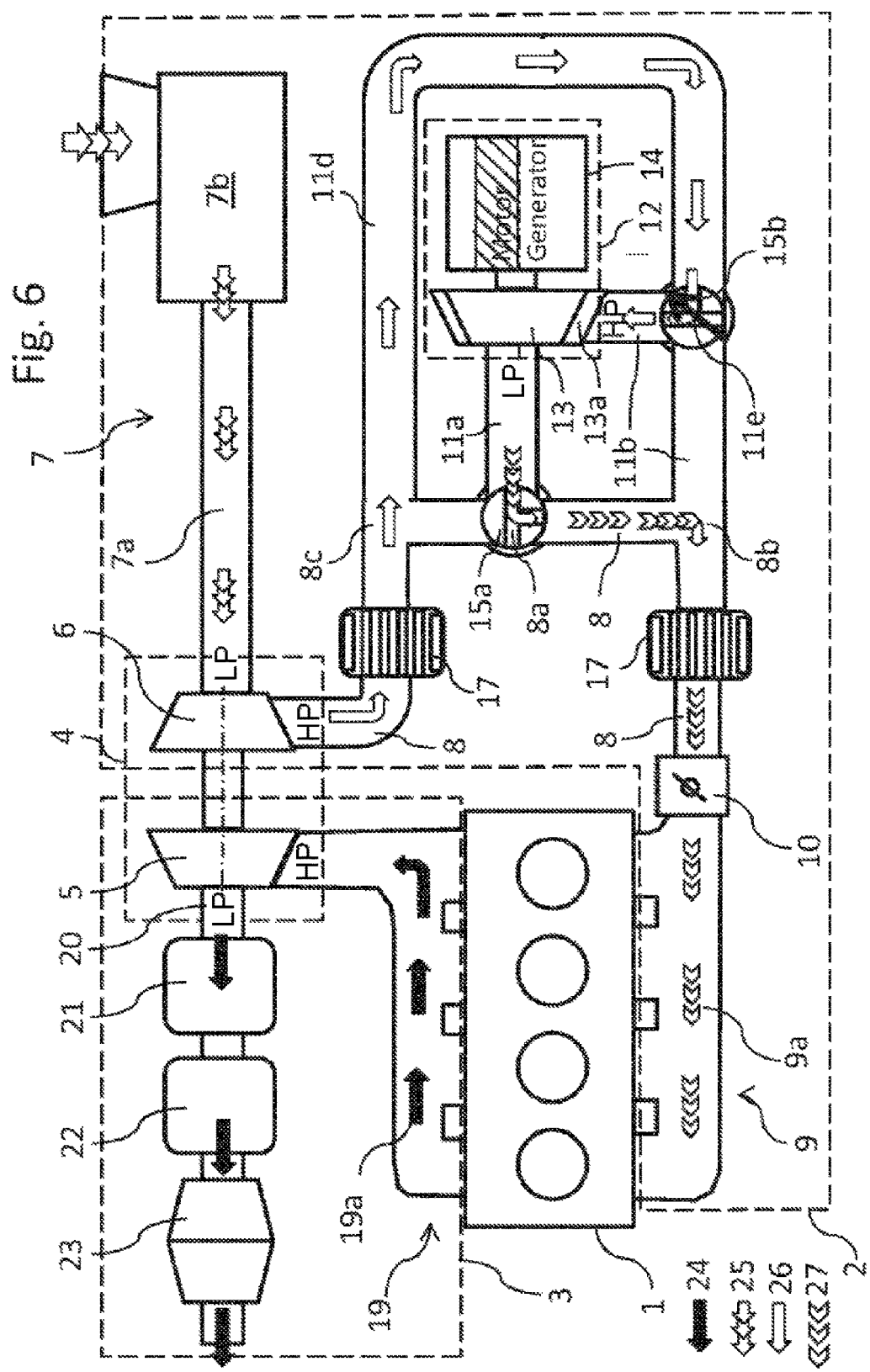
FIG. 6 shows the further example embodiment of the supercharging device as per FIG. 2, but in the recuperation operating mode.

The second valve device 15b is arranged at the high-pressure branching point 11e, wherein in a valve position with a closed passage from the charge-air bypass line 11d toward the high-pressure branch line 11b, the passage from the high-pressure side HP of the compressor-turbine 13 toward the intake side 9 of the internal combustion engine 1 is open, as illustrated in FIG. 5, and in a further valve position with an open passage from the charge-air bypass line 11d toward the high-pressure side HP of the compressor-turbine 13, the passage from the charge-air bypass line 11d toward the intake side 9 of the internal combustion engine 1 is at least partially closed (see FIG. 6).

As is clear from FIG. 5, to implement the booster operating mode, the passage from the third charge-air branch point 8c via the first charge-air branch point 8a toward the low-pressure side LP of the compressor-turbine 13 and the passage from the high-pressure side HP of the compressor-turbine 13 toward the charge-air feed line 8 are opened, wherein, at the same time, the passage of the charge-air bypass line 11d toward the high-pressure side HP of the compressor-turbine 13 and the passage of the charge-air feed line 8 between the first and the second charge-air branching points 8a, 8b are closed.

Thus, the charge-air mass flow 26 is conducted from the high-pressure side HP of the fresh-air compressor 6 via the low-pressure branch line 11a to the low-pressure side LP of the compressor-turbine 13 and from the high-pressure side HP of the compressor-turbine 13 via the high-pressure branch line 11b back into the charge-air feed line 8 and to the intake side 9 of the internal combustion engine 1. Here, the motor-generator 14 is switched into a motor mode ("generator" label struck through) and drives the compressor-turbine 13 for the purposes of increasing pressure in the charge-air feed line 8.

FIG. 6 shows substantially the same example embodiment of the supercharging device as FIG. 5. The example embodiment of FIG. 6 differs in that the compressor-turbine 13 has, by way of example, a fixed or variable guide blade arrangement 13a illustrated in schematically simplified form, the second valve device 15b is a proportional switching valve, and the illustrated valve settings define the recuperation operating mode.

To implement the recuperation operating mode, the passage of the charge-air bypass line 11d from the third charge-air branching point 8c toward the high-pressure side HP of the compressor-turbine 13 is at least partially opened and that toward the intake side 9 of the internal combustion engine 1 is at least partially closed, and the passage from the low-pressure side LP of the compressor-turbine 13 toward the intake side 9 of the internal combustion engine 13 is opened, wherein, at the same time, the passage of the charge-air feed line 8 between the third and the first charge-air branching points 8c, 8a, respectively, is closed.

In this way, the charge-air mass flow 26 is conducted from the high-pressure side HP of the fresh-air compressor 6 at least partially to the high-pressure side HP of the compressor-turbine 13 and is expanded across the compressor-turbine 13. In this embodiment of the supercharging device, the blown-off mass flow 27 that emerges on the low-pressure side LP of the compressor-turbine 13 is not blown off into the surroundings, but is conducted onward from the low-pressure side LP of the compressor-turbine 13 to the intake side 9 of the internal combustion engine 1 via the charge-air feed line 8, the throttle flap valve 10 and the charge-air manifold 9a. Here, the motor-generator 14 is switched into a generator mode ("motor" label struck through) and is driven by the compressor-turbine 13 for the purposes of energy recovery.

By virtue of the second valve device 15b being designed as a proportional switching valve 15b, it is possible for only a fraction of the charge-air mass flow 26 to be expanded across the compressor-turbine 13, and to thus set and regulate a pressure level required for the present operating state of the internal combustion engine 1.

Summarized briefly once again, the invention thus relates to a supercharging device and to an operating method for the supercharging device for an internal combustion engine 1, which supercharging device has an exhaust-gas turbocharger 4 and a recuperation charger 12, wherein the recuperation charger 12 has a compressor-turbine 13 and an electromechanical motor-generator 14 coupled thereto. Here, the high-pressure side HP and the low-pressure side LP of the compressor-turbine 13 are connectable by means of line connections and valve devices 15a-15d to the charge-air feed line 8 downstream of the fresh-air compressor 6 of the exhaust-gas turbocharger 4, wherein the recuperation charger 12 may, by means of the valve devices 15a-15d and the motor-generator 14, be switched at least between a booster operating mode and a recuperation operating mode, wherein the recuperation charger is operable firstly in the booster operating mode in a manner driven by the motor-generator 14 as a compressor for increasing pressure in the fresh-air supply line 8, and is operable secondly in a manner driven by the charge-air flow as a turbine for energy recovery by means of the motor-generator 14.

The foregoing embodiments have been shown and described for the purposes of illustrating the structural and functional principles of the present invention, as well as illustrating the methods of employing the embodiments and are subject to change without departing from such principles. Therefore, this invention includes all modifications encompassed within the scope of the following claims.

We claim:

1. A supercharging device for an internal combustion engine having an intake side, an exhaust-gas side, an intake tract arranged on the intake side and an exhaust-gas tract arranged on the exhaust-gas side, the supercharging device comprising:
    an exhaust-gas turbocharger having an exhaust-gas turbine, which is arranged in the exhaust-gas tract, and a fresh-air compressor having a low-pressure side and a high-pressure side, which is arranged in the intake tract;
    a fresh-air supply device to which the fresh-air compressor is connected on the low-pressure side thereof;
    a charge-air feed line which connects the high-pressure side of the fresh-air compressor to the intake side of the internal combustion engine for conducting a charge-air mass flow generated by the fresh-air compressor;
    a plurality of valve devices coupled to the charge-air feed line between the fresh-air compressor and the intake side of the internal combustion engine; and
    a recuperation charger which has a compressor-turbine with a high-pressure side and a low-pressure side and which has an electromechanical motor-generator coupled to the compressor-turbine, the compressor-turbine is coupled by line connections and the valve devices to the charge-air feed line in such a way that the recuperation charger is operable in a manner dependent on settings of the valve devices, at least firstly when the supercharging device is configured in a booster operating mode in a manner driven by the motor-generator as a compressor for increasing the pressure of the charge-air mass flow in the charge-air feed line, and secondly when the supercharging device is configured in a recuperation operating mode in a manner driven by the charge-air mass flow as a turbine for energy recovery by the motor-generator.

2. The supercharging device as claimed in claim 1, wherein the valve devices comprise a first valve device and a second valve device, the low-pressure side of the compressor-turbine is connected, at least via a low-pressure branch line and the first valve device, to the charge-air feed line at a first charge-air branching point, and the high-pressure side of the compressor-turbine is connected, at least via a high-pressure branch line and the second valve device, to the charge-air feed line at a second charge-air branching point downstream of the first charge-air branching point, and wherein the charge-air feed line is selectively shut off between the first charge-air branching point and the second charge-air branching point by at least one of the first valve device, the second valve device, and a further valve device of the valve devices.

3. The supercharging device as claimed in claim 2, further comprising at least one of a blow-off port and a recirculation line connected to the fresh-air supply device, the at least one of the blow-off port and the recirculation line being connected via the first valve device or a second further valve device of the valve devices to the low-pressure branch line at a low-pressure branching point between the first charge-air branching point and the low-pressure side of the compressor-turbine.

4. The supercharging device as claimed in claim 3, wherein the first valve device is a switching valve which is arranged at the low-pressure branching point, such that
    in a valve position with a closed passage from the first charge-air branching point to the low-pressure side of the compressor-turbine, a passage from the low-pressure side of the compressor-turbine to the at least one of the blow-off port and the recirculation line is open, and
    in a further valve position with an open passage from the first charge-air branch point to the low-pressure side of the compressor-turbine, the passage to the at least one of the blow-off port and the recirculation line is closed.

5. The supercharging device as claimed in claim 3, wherein the second valve device is a switching valve which is arranged at the second charge-air branching point, such that
    in a first valve position with an open passage of the charge-air feed line to the intake side of the internal combustion engine, passage from the charge-air feed line to the high-pressure branch line is at least partially closed,
    in a second valve position with a closed passage of the charge-air feed line to the intake side of the internal combustion engine and to the high-pressure branch line, the passage from the high-pressure branch line to the intake side of the internal combustion engine is open, and
    in a third valve position with an open passage of the charge-air feed line from the high-pressure side of the fresh-air compressor to the high-pressure branch line, the passage of the charge-air feed line to the intake side of the internal combustion engine is at least partially closed.

6. The supercharging device as claimed in claim 3, wherein the supercharging device is configured to switch between at least the booster operating mode, the recuperation operating mode and a standard operating mode so that the valve devices and the recuperation charger are, in each operating mode, set such that
   in the booster operating mode, the charge-air mass flow is conducted from the high-pressure side of the fresh-air compressor to the low-pressure side of the compressor-turbine and from the high-pressure side of the compressor-turbine back into the charge-air feed line and to the intake side of the internal combustion engine, and the motor-generator is switched into a motor mode so as to drive the compressor-turbine for the purposes of increasing pressure in the charge-air feed line,
   in the recuperation operating mode, the charge-air mass flow is blown off from the high-pressure side of the fresh-air compressor at least partially to the high-pressure side of the compressor-turbine and from the low-pressure side of the compressor-turbine to either into surroundings via the blow-off port or introduced into the fresh-air supply device via the recirculation line, or the charge-air mass flow is additionally conducted onward to the intake side of the internal combustion engine, and the motor-generator is switched into a generator mode so as to be driven by the compressor-turbine for energy recovery, and
   in the standard operating mode, the charge-air mass flow is conducted from the high-pressure side of the fresh-air compressor via the charge-air feed line directly to the intake side of the internal combustion engine, and the motor-generator of the recuperation charger is switched into a neutral state.

7. The supercharging device as claimed in claim 6, wherein
   in the booster operating mode, the passage from the first charge-air branch point to the low-pressure side of the compressor-turbine is opened and the passage to the at least one of the blow-off port and the recirculation line is closed, and at the same time, the passage from the high-pressure branch line to the charge-air feed line is opened and the passage of the charge-air feed line between the first and the second charge-air branching point is closed,
   in the recuperation operating mode, the passage from the first charge-air branch point toward the low-pressure side of the compressor-turbine and toward the at least one of the blow-off port and the recirculation line is closed, the passage from the second charge-air branch point toward the high-pressure side of the compressor-turbine is at least partially opened, the passage toward the intake side of the internal combustion engine is at least partially closed, and the passage from the low-pressure side of the compressor-turbine toward the at least one of the blow-off port and the recirculation line is opened, and
   in the standard operating mode, the passage from the first charge-air branching point toward the low-pressure side of the compressor-turbine and the passage from the high-pressure branch line toward the charge-air feed line are closed, and the passage of the charge-air feed line from the low-pressure side of the fresh-air compressor toward the intake side of the internal combustion engine is opened.

8. The supercharging device as claimed in claim 2, further comprising a charge-air bypass line which is connected at one side to the charge-air feed line at a third charge-air branching point upstream of the first charge-air branching point and which is connected at the other side to the high-pressure branch line via at least one of the second valve device and a second further valve device of the valve devices at a high-pressure branching point, the charge-air feed line is selectively shut off from the first charge-air branching point toward the third charge-air branching point by at least one of the first valve device and a third further valve device of the valve devices.

9. The supercharging device as claimed in claim 8, wherein the first valve device is a switching valve which is arranged at the first charge-air branching point, such that
   in a first valve position with a closed passage from the first charge-air branching point toward the low-pressure branch line, the passage of the charge-air feed line from the high-pressure side of the fresh-air compressor to the intake side of the internal combustion engine is open,
   in a second valve position with a closed passage from the first charge-air branching point toward the intake side of the internal combustion engine, the passage from the high-pressure side of the fresh-air compressor toward the low-pressure branch line is open, and
   in a third valve position with a closed passage of the charge-air feed line from the first charge-air branching point toward the high-pressure side of the fresh-air compressor, the passage from the low-pressure branch line toward the intake side is open.

10. The supercharging device as claimed in claim 8, wherein the second valve device is a switching valve which is arranged at the high-pressure branching point, such that
    in a first valve position with a closed passage from the charge-air bypass line toward the high-pressure branch line, the passage from the high-pressure side of the compressor-turbine toward the intake side of the internal combustion engine is open, and
    in a second valve position with an open passage from the charge-air bypass line toward the high-pressure side of the compressor-turbine, the passage from the charge-air bypass line toward the intake side of the internal combustion engine is at least partially closed.

11. The supercharging device as claimed in claim 8, wherein the supercharging device is configured to switch between at least the booster operating mode, the recuperation operating mode and a standard operating mode so that
    in the booster operating mode, the passage from the third charge-air branch point via the first charge-air branch point toward the low-pressure side of the compressor-turbine and the passage from the high-pressure side of the compressor-turbine toward the charge-air feed line are opened, and at the same time, the passage of the charge-air bypass line toward the high-pressure side of the compressor-turbine and the passage of the charge-air feed line between the first and the second charge-air branching points are closed, and
    in the recuperation operating mode, the passage of the charge-air bypass line from the third charge-air branching point toward the high-pressure side of the compressor-turbine is at least partially opened and toward the intake side of the internal combustion engine is at least partially closed, the passage from the low-pressure side of the compressor-turbine toward the intake side of the internal combustion engine is opened, and at the same time, the passage of the charge-air feed line between the third and the first charge-air branching points is closed, and in the standard operating mode, the passage of the charge-air line from the high-pressure side of the fresh-air compressor to the intake side of the internal combustion engine is opened, and the passage of the low-pressure branch line toward the low-pressure side of the compressor-turbine and the passage of the high-pressure branch line toward the charge-air feed line are closed.

12. The supercharging device as claimed in claim 1, further comprising one or more charge-air coolers arranged at one or more positions in the charge-air feed line upstream or downstream of the compressor-turbine in the charge-air mass flow.

13. The supercharging device as claimed in claim 1, wherein the compressor-turbine of the recuperation charger has a compressor-turbine housing with, arranged therein, a fixed or variable guide blade arrangement for improving outflow behavior or inflow behavior of the charge-air mass flow.

14. The supercharging device as claimed in claim 1, wherein the fresh-air supply device has a fresh-air supply line and a fresh-air filter device.

15. The supercharging device as claimed in claim 1, wherein the supercharging device is configured to, during operation, be switched at least between the booster operating mode and the recuperation operating mode, or between a standard operating mode, the booster operating mode and the recuperation operating mode, in a manner dependent on an operating behavior of the internal combustion engine and by settings or configurations of the valve devices and the motor-generator of the recuperation charger.

\* \* \* \* \*